United States Patent [19] [11] 4,165,808
Stumpf [45] Aug. 28, 1979

[54] UPHOLSTERY COIL TRANSFER MECHANISM

[75] Inventor: Walter Stumpf, Munster, Ind.

[73] Assignee: Simmons Company, Atlanta, Ga.

[21] Appl. No.: 829,218

[22] Filed: Aug. 31, 1977

[51] Int. Cl.² .............................................. B65G 47/90
[52] U.S. Cl. .................................... 414/736; 414/753; 414/783
[58] Field of Search ................. 214/1 BB, 1 BT, 1 B, 214/1 BS, 8.5 C, 1 Q, 1 QA, 1 BD, 1 BV, 147 T; 198/379, 402

[56] References Cited
U.S. PATENT DOCUMENTS

| 1,926,041 | 9/1933 | Freese | 214/1 BD |
| 2,794,563 | 6/1957 | Daines et al. | 214/1 BD X |
| 2,832,478 | 4/1958 | Malewicz et al. | 214/1 BD |
| 2,862,630 | 12/1958 | Nelson et al. | |
| 3,328,839 | 7/1967 | Treece et al. | 214/1 BD X |
| 3,990,587 | 11/1976 | Redman | 214/147 T X |
| 4,026,420 | 5/1977 | Cuniberti | 214/1 BT |

Primary Examiner—Frank E. Werner
Attorney, Agent, or Firm—Fitch, Even & Tabin

[57] ABSTRACT

A reciprocating transfer mechanism having grippers for grasping and extracting a row of upholstery spring coils from a coil feeder and thrusting the coils into a spring assembly machine in a continuous composite coil-reorienting delivery movement which simultaneously conditions alternate grippers for the succeeding transfer cycle without reorientation thereof on the return movement.

2 Claims, 9 Drawing Figures

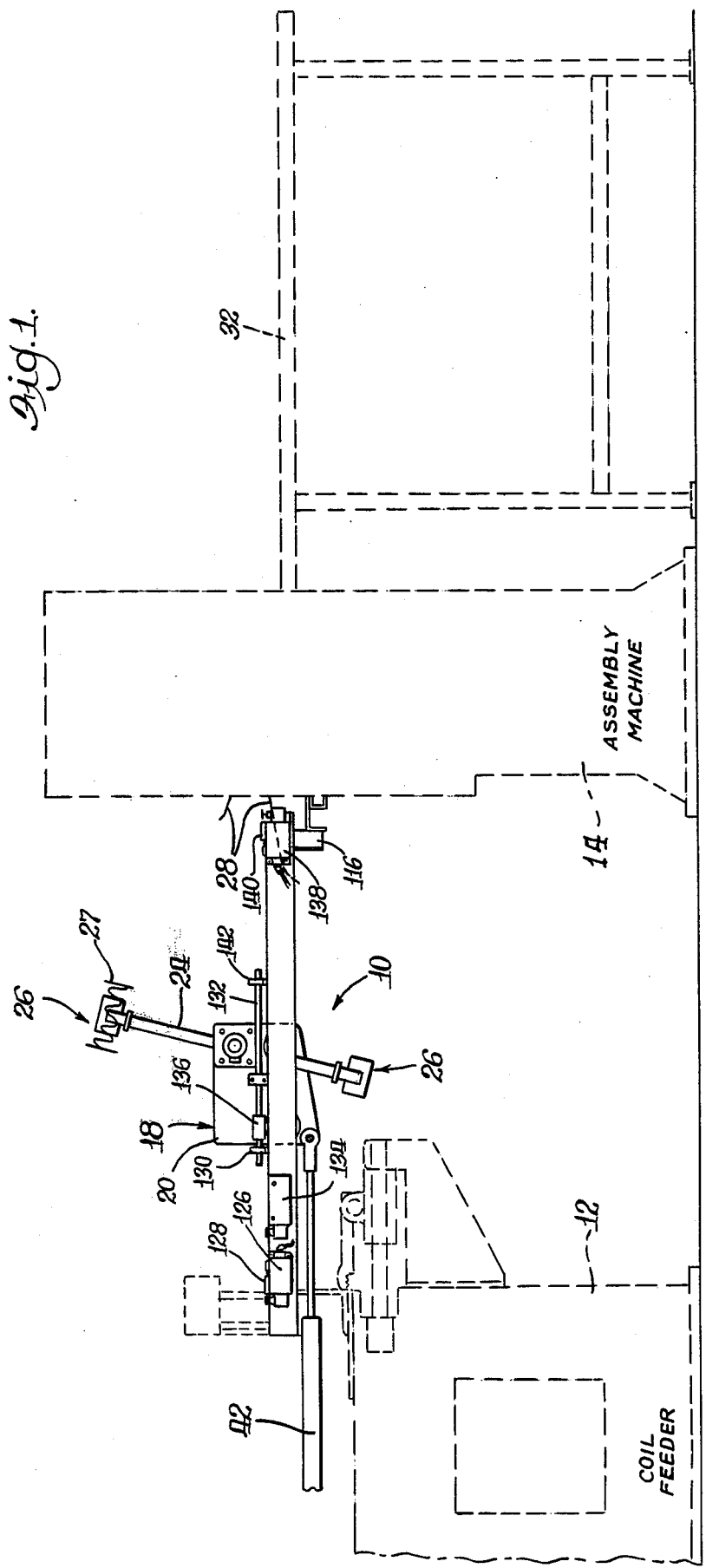

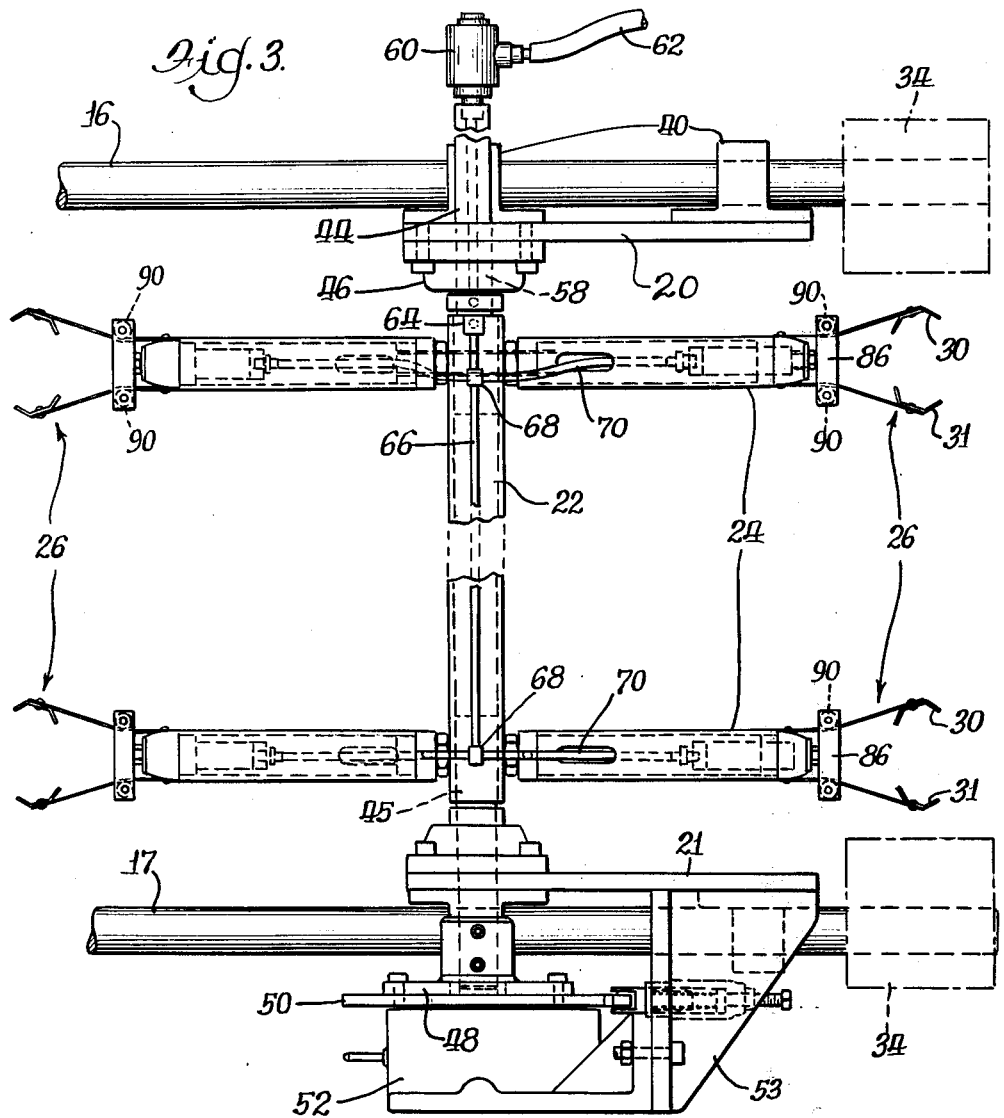
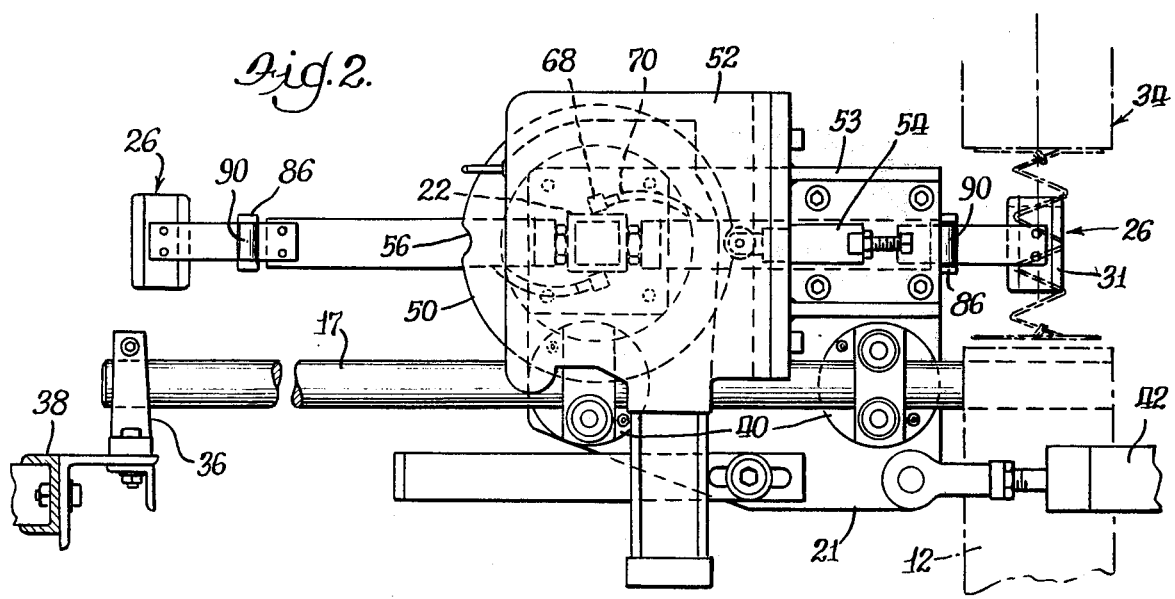

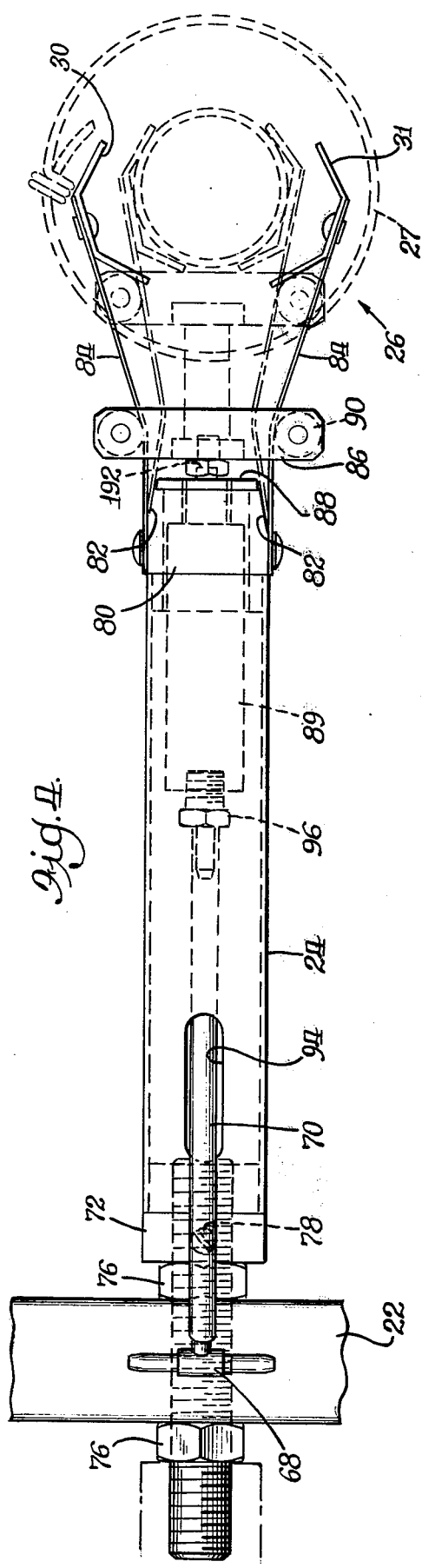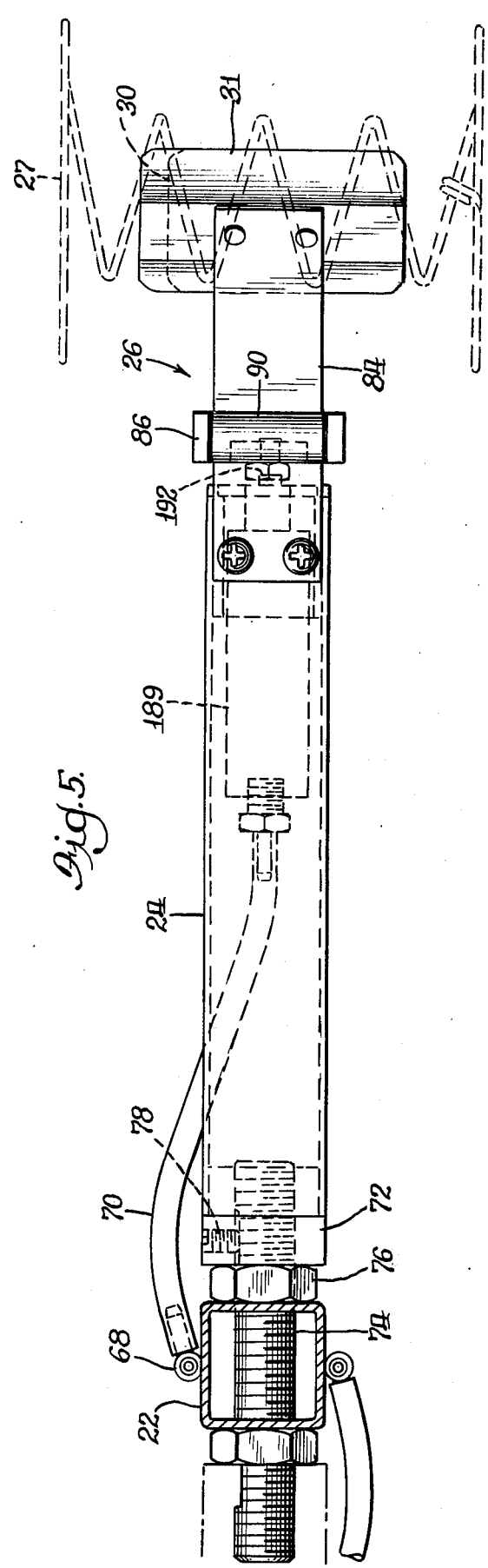

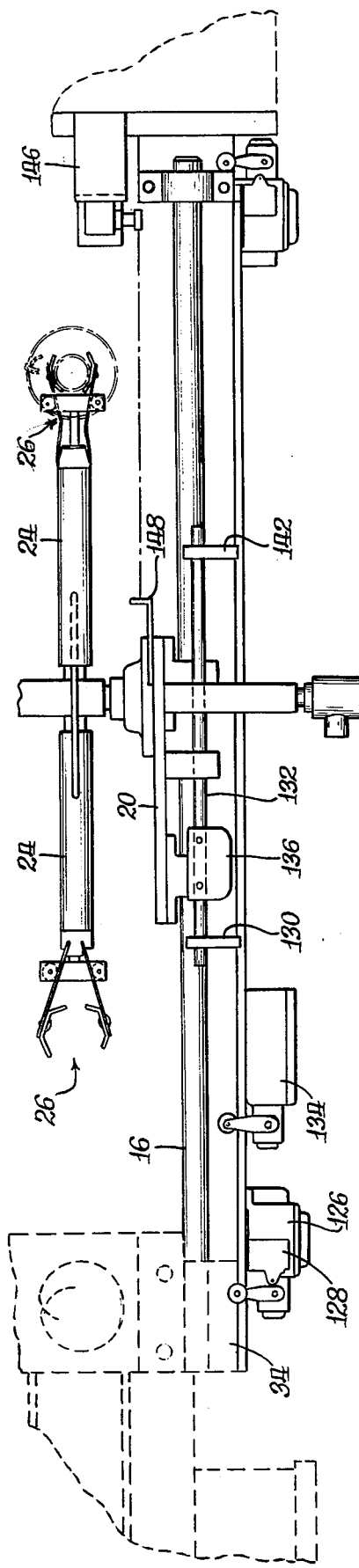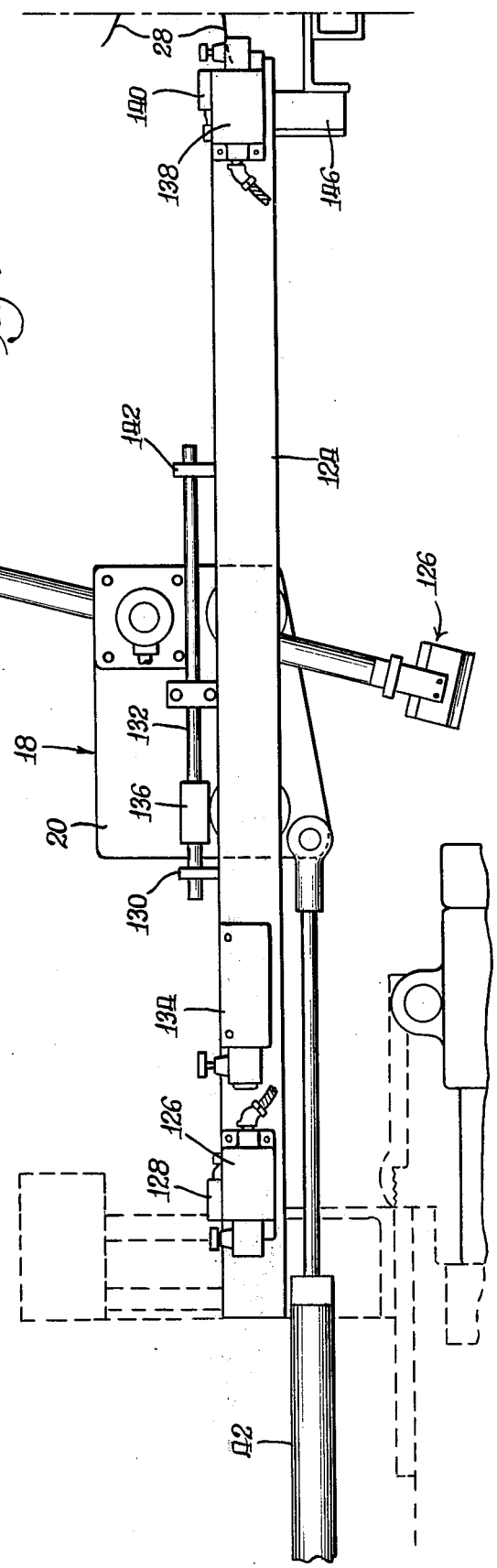

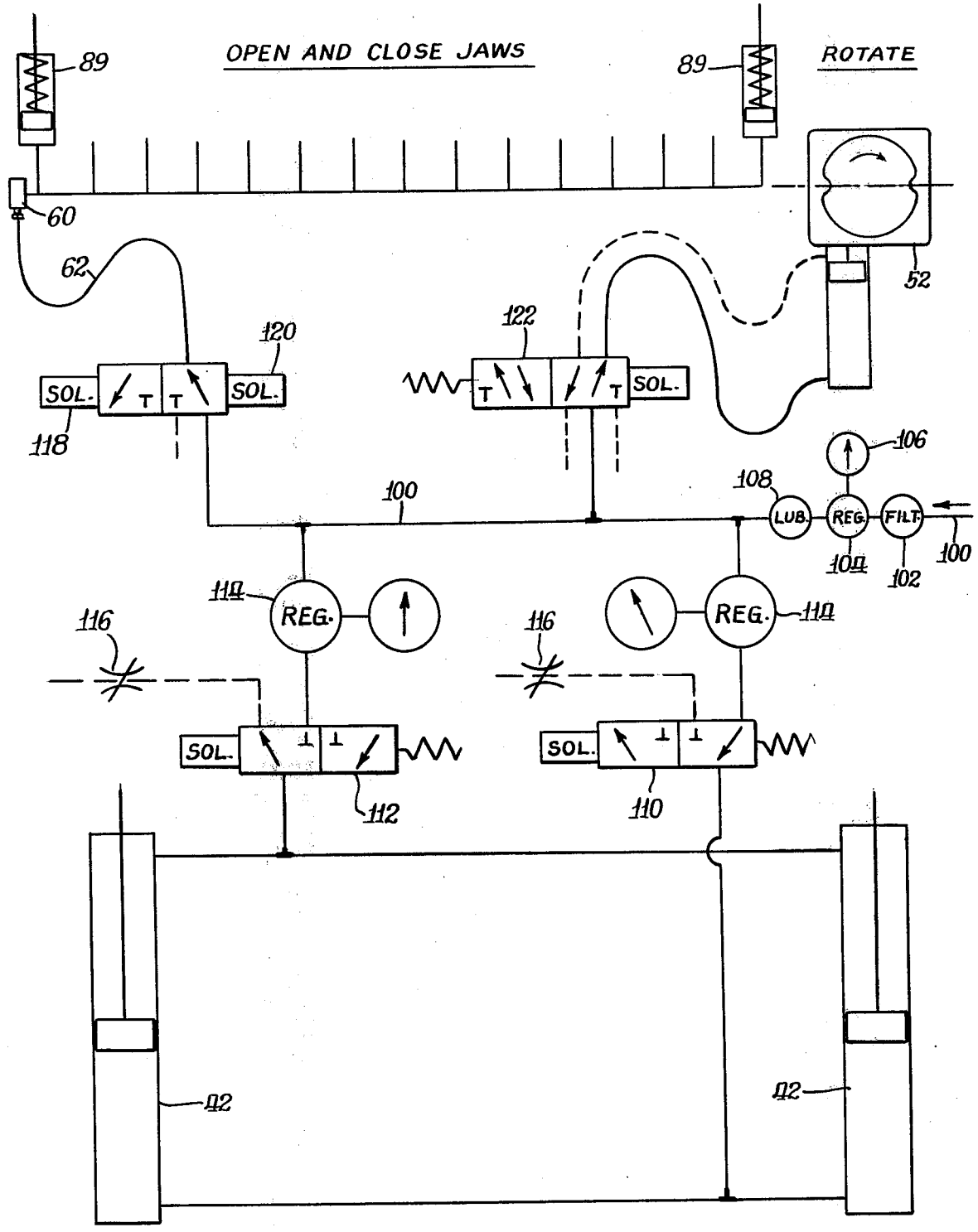
Fig. 8. TRANSFER ARMS

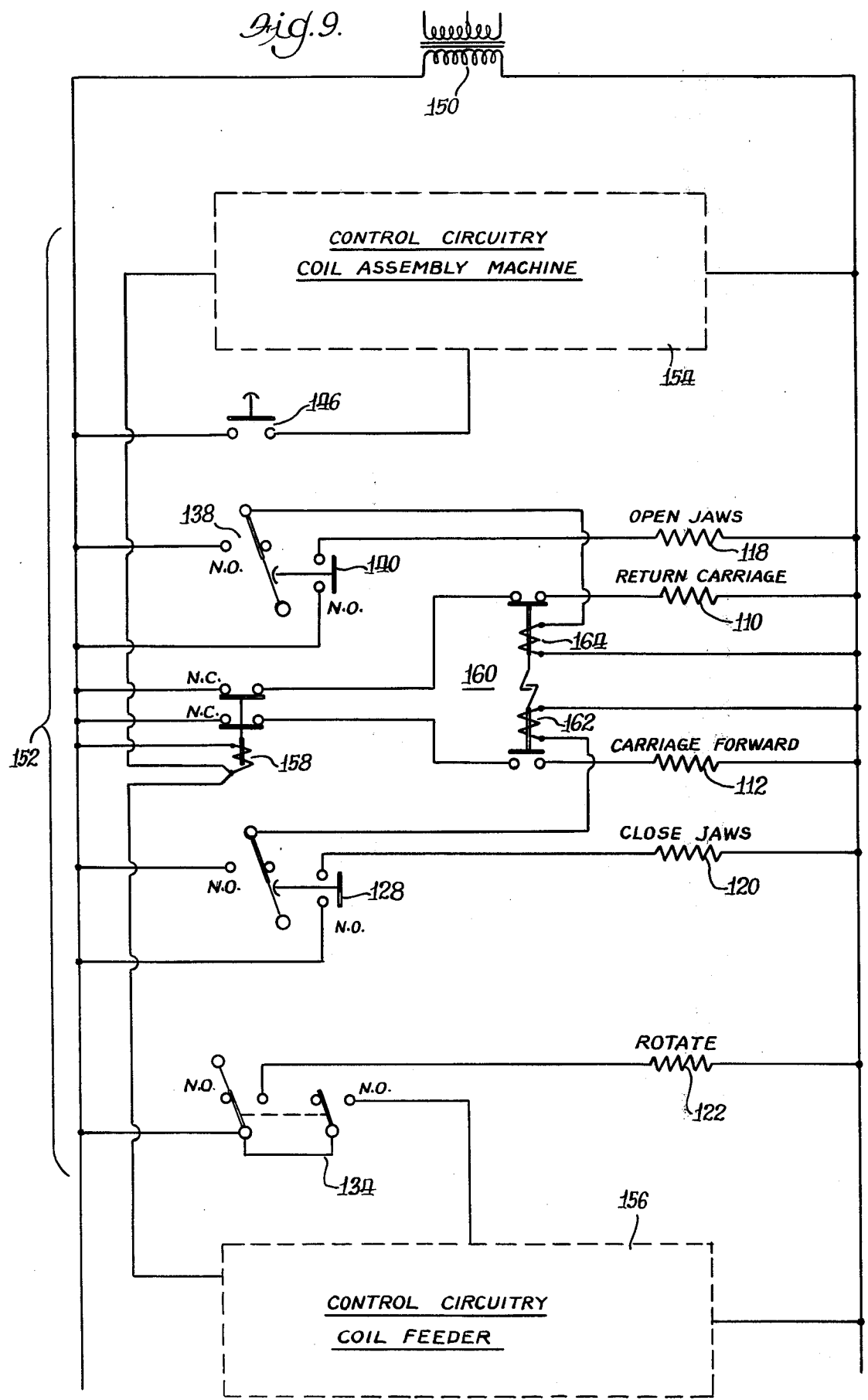

UPHOLSTERY COIL TRANSFER MECHANISM

BACKGROUND AND SUMMARY OF THE INVENTION

This invention relates to machinery for the assembly of upholstery spring coils into "constructions," so-called, which become the cores of mattresses or cushions.

More particularly, it relates to improvements in mechanism for transferring upholstery spring coils, a row at a time, from a feeding station to a delivery station, usually the input end of an automatic assembly machine such as that illustrated in Woller U.S. Pat. No. 2,388,100, or the assembly machines manufactured by Wells, Woodfield, or Spuhl.

The transfer mechanism of the invention is particularly suited to the fully automated assembly of spring coil constructions, i.e., one in which the assembly begins with a coil feeder such as the feeder of my U.S. Pat. No. 3,193,136, capable of isolating a row of individual spring coils from a bulk supply of coils in nested stacks for subsequent delivery by the transfer mechanism directly into the jaws or other receiving station of the assembly machine.

In such an automated repetitive operation, the production rate is governed by the cycling time of the slowest constituent part, which, in the case of a system including the three principal elements of feeder, transfer mechanism, and assembly machine, has, in my experience, been the transfer mechanism, particularly when the assembly machine cycle is foreshortened for twin size and other narrow constructions.

It is accordingly the object of my improved transfer mechanism to reduce the period of its operating cycle by an economy of movement of the operating parts to achieve a faster yet smoother and more vibration-free movement than marked the operation of earlier mechanisms for this purpose. In particular, the transfer of spring coils, a row at a time, from the coil feeder into the assembly machine involves the movement of the coils across the substantial intervening distance which is maintained to provide access for maintenance of, and for the clearing of occasional operational difficulties in, the assembly machine. The actual transfer of coils is preceded by the extraction of the spring coils from the feeder by the transfer mechanism at the initiation of the transfer movement, and completed by their forcible insertion by the transfer mechanism into the assembly machine, the spring coils being turned end for end by a half-rotation which carries them from a trailing position at the rear of the transfer mechanism to an advancing front position during the delivery movement of the transfer mechanism. In the known mechanisms which employ the overturning movement of the coils through a half-revolution on the forward movement of the transfer mechanism, the transfer mechanism likewise rotates a reciprocal half-turn in the reverse direction during the return movement to reposition the coil gripping mechanisms anew at the feeding station for the beginning of the next cycle.

As will become apparent from the following description, my improved transfer mechanism eliminates the need for a resetting movement on the return travel of the transfer mechanism by employing a second and opposed set of coil grippers which are already positioned for a new cycle by the half-rotation of the coils on the forward delivery motion of the transfer mechanism, and, accordingly, eliminates the need for that energy and time-consuming resetting movement on the return movement of the transfer mechanism to the feeder.

DESCRIPTION OF THE DRAWINGS

The invention and its purpose will be better understood from the following detailed description taken in conjunction with the accompanying drawings, in which:

FIG. 1 is a side elevation of a spring coil assembly system illustrating, in a material flow direction from left to right, a coil feeder, the transfer mechanism of the invention, and an assembly machine for receiving the spring coils a row at a time to unite them into a spring assembly;

FIG. 2 is an enlarged, fragmentary elevational view of the carriage of the transfer mechanism seen from the side oppposite that seen in FIG. 1;

FIG. 3 is a foreshortened top view of the carriage of the transfer mechanism showing both of its ends and two sets of the opposed arms which grasp, hold, and release the individual spring coils;

FIG. 4 is an enlarged top view of a single gripper and showing by broken line the encircling grip of the jaws about the "waist" of a double-cone or "hourglass" coil;

FIG. 5 is a side elevation of the arm of FIG. 4;

FIG. 6 is an enlarged fragmentary top view of the end of the carriage seen in FIG. 1, and showing in more detail the switches and switch operators which control the sequence of movement of the various components of the transfer mechanism and their relation to the operation of the coil feeder on the one side and the assembly machine on the other;

FIG. 7 is an enlarged fragmentary side view of the same carriage end to complement the illustration of the aforementioned switches and switch operators;

FIG. 8 is a schematic diagram of the pneumatic circuit to the several operating portions of the transfer mechanism, which in the illustrated case is powered by compressed air; and FIG. 9 is a diagram of the electrical circuitry by means of which the sequence of the operations of the various air-powered components of the apparatus is governed.

I. THE ENVIRONMENT OF THE INVENTION

FIG. 1

As earlier indicated, my improved transfer mechanism 10 is utilized to greatest advantage in an integrated system illustrated in FIG. 1, in which it grasps an entire row of coils at one time from the delivery station of a coil feeder 12, and delivers the coils into the jaws or other receiving station of an assembly machine 14.

In such an integrated system, coils in bulk, in the form of nested stacks of coils, are supplied to the coil feeder 12, such as that of my U.S. Pat. No. 3,193,136, which extracts a row of the coils, one from each of the multiple stacks, and presents them, properly oriented, at the delivery station of the feeder for pick-up by the transfer mechanism 10.

The transfer mechanism 10 plies back and forth between the coil feeder 12 and the assembly machine 14, being mounted on spaced tracks or ways 16 and 17 for rolling movement between the two machines which it serves. It comprises a carriage 18 in the form of a pair of side plates 20 and 21, each roller-mounted on its own track 16 and 17 respectively, and connected together by a rotatable shaft 22 which carriers a multiplicity of opposed transfer arms 24 each having at its end a gripper 26 designed to grasp a double-cone wire coil 27 at mid-height, and, as the carriage 18 moves forward, to hold the coil firmly to extract it forcibly from the delivery station of the feeder 12, in which it is maintained under slight axial compression.

As the carriage is propelled forward toward the assembly machine 14, the shaft 22 and its arms 24, with the firmly-held row of coils, is rotated forwardly in an overturning movement through a half-revolution, which turns the coils end for end.

The forward movement of the carriage ends with the thrust of the coils between the converging guide plates 28 of the assembly machine to deposit them into that machine. The coil-gripping jaws 30 and 31 then open, and the transfer mechanism returns without any rotation of the transfer arm shaft, thus preventing at the delivery station of the coil feeder the opposite set of grippers 26, which was idle on the forward movement of the carrige. The gripping jaws 30 and 31 thereof are then caused to close about a new row of coils, and the transfer mechanism is once more redirected toward the assembly machine in a new feeding cycle.

In the course of movement of the transfer mechanism back and forth, it also initiates the respective working cycles of the two machines which it serves. In particular, having gripped a row of coils at the delivery station of the feeder 12 and having started forward toward the assembly machine 14, the transfer mechanism 10 re-initiates another cycle of the feeder to ready yet another row of coils for subsequent transfer. Upon the delivery of the transported row of coils to the assembly machine, the transfer mechanism initiates the operating cycle of that machine, releases its grip upon the coils, and returns to the feeder to repeat its cycle, using alternate sets of transfer arms and coil grippers in successive cycles.

In the assembly machine 14, in the manner well understood in the upholstery spring assembly art, successive rows of coils, clenched in the jaws of the assembly machine, are connected together by the spinning of a helical tie wire about the juxtaposed end convolutions of the contiguous rows of springs, with the partially assembled spring construction being expelled, one row at a time, onto a run-out table 32 by indexing mechanism in the assembly machine.

II. THE TRANSFER CARRIAGE AND DRIVE

Mounted upon and extending between the two machines served by the transfer mechanism 10 are the tracks 16 and 17 upon which the transfer mechanism reciprocates. These consist of a pair of spaced circular bars, one at each side of the transfer mechanism, and each mounted horizontally between a mounting block 34 secured to the frame of the feeder 12 and a bracket 36 at the assembly machine end of the track, the bracket 36 being secured to a channel beam 38 spanning the front of the spring assembly machine between frame standards at either side thereof.

As earlier noted, the carriage side plates 20 and 21 are connected to each other by the transfer arm shaft 22. Each side plate is supported upon its respective track by two pairs of flanged rollers 40 which confine the track between them, and which are rotatably adjustable as an assembly on the end plate to adjust the clearance between the rollers and the track. Propulsion for the reciprocal motion of the transfer carriage 18 is provided by two double-acting air cylinders 42 mounted upon the upper surface of the base frame of the coil feeder, each piston rod thereof being connected by pin-and-clevis to its associated end plate of the carriage.

III. THE TRANSFER ARM MOUNTING AND OPERATION

The transfer arm shaft 22 which extends between the carriage side plates, is a square steel tube with shaft inserts 44 and 45 at opposite ends to provide journals which are received in roller bearings 46 mounted on the carriage side plates.

On the end of the shaft seen at the bottom of FIG. 3, the shaft insert 45, after passing through the bearing, is provided with a flange coupling 48 through which it is connected to the driving flange 50 of a one-way, indexing air motor 52. The motor is bolted to a mounting bracket 53 secured to side plate 21 of the carriage. The indexing motor I prefer for the purpose is a commercially obtainable unit sold under the name "Allen Air" and comprises internally a double-acting, opposed-piston rack engaging a pinion connected to turn the driving flange 50 unidirectionally and intermittently through a one-way clutch, turning its drive flange through one-half revolution on each stroke of the driving rack, and I provide it additionally with an external positive-positioning roller detent 54 which is spring urged alternately into opposed notches 56 on the periphery of the driving flange 50 of the indexing motor at the completion of each driving stroke of the rack.

At the opposite end of the transfer arm shaft 22, the shaft insert 44 is blind-bored to provide a central passageway 58 for the incoming compressed air which powers the operating cylinders for the gripping jaws. Pressure air is delivered to the passage 58 through a swivel union 60 by a flexible hose 62 which accommodates the back-and-forth movement of the transfer carriage 18. From opposed elbow fittings 64 on opposite sides of the shaft insert, two manifold lines 66 run lengthwise of the shaft, each supplying the gripper-operating cylinders of one set of transfer arms through T-connectors 68 to separate lines 70 to each cylinder.

Each transfer arm 24 comprises a round tube with a centrally bored and tapped plug 72 brazed in its mounting end (FIGS. 4 and 5). Opposed arms are thus threaded onto opposite ends of a mounting stud 74 which passes transversely through the shaft 22 being secured therein by opposed jam nuts 76 drawn up tight to the walls of the tubular shaft. A set screw 78 in the end plug 72 seats itself on a flat milled on the mounting stud 74 to secure the tubular arm and its gripping jaws in proper position for seizing a spring coil from the feeder 12, and thrusting it into the assembly machine 14.

At the gripper end, each transfer arm 24 is provided with another plug 80 which is cylindrical in its portion inserted within the tubular arm, but rectangular externally of the tube, and with tapered sides 82. Two opposed spring leaves 84 each having thereon one of the gripper jaws 30 and 31, are screwed to opposite sides of the plug 80, whose tapered side surfaces provide clearance for the gripping movement of the two spring leaves 84 toward each other.

The spring leaves 84 are bent to flare away from each other and thus to hold the opposed gripper jaws 30 and 31 in normally open position, the jaws being brought together to clamp the spring about its mid-section by a clamping yoke 86 actuated by the air cylinder in the transfer arm (FIG. 4). The jaw 30 is slightly shorter in height than its mate 31 to fit the spring, i.e., to avoid the increasing radius of the upper helical convolution.

The same end-plug 80 which supports the gripper-jaw spring leaves 84 is bored to receive a flanged bushing 88 which is centrally threaded to take the threaded mounting end of a small single-acting, spring-return air cylinder 89 (such as Bimba Model 041), and is secured in the end plug 80 by countersunk machine screws passing through the flange of the bushing into the end face of the plug.

The clamping yoke 86 comprises a pair of spaced rollers 90 journalled on roll pins anchored in the yoke frame, and bearing against the outside surfaces of the gripper-jaw spring leaves 84. The end of the piston rod 92 is threaded into the yoke frame, so that as the rod is extended by the admission of pressure air to the cylinder, the jaws close, and, as the cylinder is vented, the jaws open.

The single air line 70 to each cylinder 89, housed within the tubular transfer arm, passes from the T-connector 68 at the manifold line through a slot 94 in the tube wall to a nipple connector 96 at the base of the cylinder. The same lines and manifolds both supply air to, and vent air from the gripper cylinders 89 through a control valve described in connection with the pneumatic circuit diagram of FIG. 8.

THE PNEUMATIC CIRCUITRY

FIG. 8

The air circuit is shown schematically in FIG. 8, in which the propulsion cylinders 42 and associated control valves for the transfer carriage are shown in the lower portion of the drawing, the indexing motor 52 for the half-rotation of the transfer carriage shaft, the cylinders 89 for the opening and closing of the gripper jaws of the transfer arms, and their associated control valves, in the upper portion of the drawing, with a common air supply line 100 entering the diagram centrally, from the right.

The latter assumes a source supply of compressed air which enters the immediate circuitry through the usual filter 102, pressure regulator 104 with gauge 106, and lubricator 108. It is also assumed, in accordance with good practice, that the common line 100 is of sufficient size that in manifolding the several air demands, it can, when required, supply all simultaneously without detracting substantially from the air supply to any one demand.

Referring first to the carriage propulsion circuitry in the lower portion of the diagram, it will be seen that the two long stroke, double-acting cylinders 42 which propel the transfer carriage 18 have their respective cap ends and rod ends connected in common, with the cap ends under the control of a 3-way solenoid-operated spring-return valve 110 and the rod ends each similarly connected in common to a 3-way solenoid-operated spring-return valve 112. Each such valve in turn is separately connected to the common supply line 100 through its own regulator 114 and each valve is also connected to vent to atmosphere through a flow-control valve 116. Also, although not indicated in the pneumatic circuit diagram, the two valves 110 and 112 are normally operated alternatively in repetitive sequence, the normal power-off position of both valves being that which is shown in the diagram by the valve 110 which controls the cap end of the cylinder, i.e., with air pressure on both sides of the piston, the objective being to stop the transfer carriage on its tracks when power to the actuated solenoid valve 110 or 112, whichever it may be, is interrupted.

To further this purpose, pressure air is supplied to each 3-way valve through the separate regulator 114 so that the pressure to the rod ends of the propulsion cylinders 42 can be maintained at a value higher than at the cap end to compensate for the piston-area loss represented by the piston rod. The pressure regulators 114 are thus set, as indicated in the diagram, to maintain the necessary pressure imbalance to lock the pistons of the propulsion cylinders in place when power to the then-controlling solenoid is interrupted.

In the upper portion of the diagram, the multiple spring-return cylinders 89 which operate the gripping jaws are connected through the swivel union 60 by the flexible hose 62 to a double-solenoid 3-way valve whose two solenoids are numbered 118 and 120. When the solenoid 120 is energized, the valve (as indicated in the diagram) connects the cap end of the gripper cylinders 89 to the air supply 100 to close the gripper jaws as earlier explained. When in the opposite position by the energization of solenoid 118, the cap ends of the gripper cylinders are vented to atmosphere through the same line 62, and the springs contained within the several air cylinders 89 return the pistons thereof to the cap ends, withdrawing the gripper yokes and permitting the jaws to open.

The opposed piston arrangement of the half-revolution indexing motor is represented in the diagram as a double-acting cylinder which, in effect, it is. The two ends of the cylinder are connected to a 5-way solenoid-operated spring-return valve 122 which also provides a connection to the common pressure line 100 and alternate vents to atmosphere. The valve 122 is shown in its normal position, maintained under the effect of the return spring, applying pressure in the driving direction of the piston and with the upper cylinder vented to atmosphere. In operation then, with essentially momentary energization of the solenoid of valve 122, the application of air pressure is reversed from that shown in the diagram to move the piston and its associated rack downwardly, i.e., in the non-driving direction of the one-way clutch, and, upon the immediate de-energization of the solenoid, the valve returns to the position shown in the diagram, thus moving the piston and rack on its upward driving stroke to rotate the transfer arms through one half-revolution. The momentary energization of the solenoid valve 122 controlling the indexing motor occurs only on the forward or delivery movement of the transfer carriage.

PLACEMENT OF THE ELECTRICAL SEQUENCING SWITCHES (FIGS. 6 and 7), and the Electrical Circuit (FIG. 9)

Mounted on the near side of the machine as seen in FIG. 1, and shown in greater detail on the fragmentary enlargements of FIGS. 6 and 7, is a switch bar 124 upon which are mounted the majority of the control switches for the various solenoid-operated valves which control the air supply to the transfer functions, as well as those switches which initiate the operating cycle of the coil feeder and of the assembly machine.

The switch bar 124 is supported at one end directly upon the track-mounting block 34 on the coil feeder 12 and at the other end by the track mounting bracket 36 at the assembly machine. The actuating roller arms of the several switches are positioned to be engaged by switch operators secured to the side plate 20 of the transfer carriage 18.

Referring specifically to FIGS. 6 and 7, and proceeding from left to right in those drawings, the switch 126 at the far left is actuated upon the return of the transfer carriage 18 to the coil feeder 12 to pick up a new row of coils. It is a normally-open time-delay switch which, when closed, energizes the solenoid of the 3-way valve 112 connected to the rod end of the propulsion cylinders to vent the rod ends to atmosphere, and thus to permit the piston to drive the transfer carriage forward.

Mounted on top of the lever-operated time delay switch 126 in "piggyback" fashion is a physically smaller, normally-open MICRO switch 128 whose operating leaf is physically adjacent to the actuating arm of the time delay switch 126 so as to be operated simultaneously thereby. The latter energizes the solenoid 120 to close the gripper jaws. The operator for these two switches takes the form of an arm 130 projecting sidewardly from a mounting rod 132 which extends longitudinally of the carriage end plate 20, being adjustably secured in a bracket thereon.

Next in order along the switch bar 124 is a one-way normally open, double pole limit switch 134, one pole of which is connected to energize the solenoid of the valve 122 which controls the indexing motor 52 to rotate the transfer arms on the forward movement of the carriage. The other pole of the switch 134 is connected to initiate a new cycle of operation of the coil feeder 12. Although the actuating arm of the switch 134 is operated in both directions of travel of the carriage, being positioned in the path of an operating cam 136 also secured to the mounting rod 132, the switch is actuated only by that movement of its actuating arm caused by the forward movement of the carriage. The cam 136 is extended in the direction of movement of the transfer carriage sufficiently to provide for momentary energization of the solenoid valve of sufficient duration to complete the downward or cocking stroke of the drive rack of the indexing motor before the valve 122 is reversed to initiate the upward driving stroke of the rack.

At the far right of the switch bar 124 is another "piggy-back" combination of two switches, i.e., another normally-open time delay switch 138 which serves to energize the solenoid of the valve 110 to the cap end of the propulsion cylinders 42 to vent the cap ends for the return of the carriage 16, and a smaller surmounted, normally-open Micro-switch 140 which serves when simultaneously actuated to energize the solenoid 118 of the valve controlling the gripper cylinders to cause the jaws to open to release the springs now deposited in the assembly machine at the end of the forward delivery stroke of the transfer carriage. The latter "piggyback" combination is operated by a sidewardly extending arm 142 at the front end of the mounting rod 132. Also at the extreme right end, although not mounted on the switch bar 124 itself, but rather upon a bracket 144 secured to the cross beam 38, is a roller-arm actuated switch 146 which initiates the operating cycle of the assembly machine 14, that switch being operated by a separate switch operating bracket 148 secured to the side plate 20 of the carriage on the inside surface thereof (FIG. 6).

In summary, the "piggyback" switch combination 126-128 at the feeder end of the switch bar 124 serves to close the gripper jaws about the row of coils at the feeder and start the forward movement of the carriage toward the assembly machine. The next switch in line is the one-way double-pole switch 134 operated only on the forward stroke of the transfer mechanism and positioned to be operated only after the carriage has advanced sufficiently to remove the spring coils from the feeder. Switch 134 operates the indexing motor to rotate the transfer arms, and, at the same time, initiates a new cycle of the coil feeder. When the transfer carriage 16 reaches the far end of its stroke, the half-revolution of the transfer arms having been completed in time to thrust the spring coils between the converging guide plates 28 of the assembly machine, the switches 138, 140, and 146 at the far end of the carriage stroke are actuated to open the gripper jaws, start the cycle of the assembly machine and, after a momentary time delay, to return the transfer carriage back to the feeder.

The electrical circuitry is shown diagramatically in FIG. 9. Beginning at the top, a reduction transformer 150 supplies control voltage to three branches of circuitry, viz, the mid portion 152 of the diagram for the transfer mechanism per se, an upper branch 154 for the control of the assembly machine, and a lower branch 156 for the control of the various functions of the coil feeder. The details of the control circuitry of the assembly machine and of the coil feeder which are not essential to an understanding of the transfer mechanism are omitted and represented as "black boxes" connected to the transfer mechanism circuitry 152 through the respective switches 146 and 134 which initiate the cycle of operations of the assembly machine and of the coil feeder, and also by their separate lines to a double-pole sensing relay 158 which is connected to open the circuits to both of the single-solenoid valves 110 and 112 which control the propulsion cylinders so as to stop the transfer mechanism on its track in the event of malfunction of the assembly machine or of the coil feeder.

In addition to the normally-closed contacts of the sensing relay 158, the solenoids which operate the valves 110 and 112 to control the movement of the transfer carriage are respectively and alternately energized by the contacts of a mechanical-latch relay 160. The lower coil 162 of the mechanical latch relay is momentarily energized by the time-delay switch 126 which is closed at the end of the return travel of the carriage, thus closing the lower contacts of the mechanical latch relay to energize the solenoid of the control valve 112 for the rod ends of the propulsion cylinders 42 to vent the rod ends for the forward travel of the carriage 16. The upper coil 164 of the mechanical latch relay is energized through the normally-open time delay switch 138 adjacent the assembly machine so that when the upper, normally-open contacts of the mechanical latch relay are closed, the lower contacts are automatically opened, de-energizing the solenoid of the rod-end control valve 112, and energizing the solenoid of the cap-end control valve 110 causing the latter to vent to return the transfer carriage to the feeder.

The two solenoids 118 and 120 of the double-solenoid 3-way valve which controls the gripper cylinders 89 are energized by the surmounted piggyback switches 140 and 128 which are normally open and remain closed only as long as the switch arm of the respective "host" time-delay switches 138 and 126 remain deflected.

SUMMARY

It will be appreciated from the foregoing description that the overall production rate of an integrated system for the automated assembly of individual coil springs supplied to such a system in bulk is limited by the longest of the time cycles of its three constituent parts, namely, the coil feeder, the transfer mechanism, and the assembly machine. At the present time, the transfer mechanism is inherently the slowest operation, with the other two both being sufficiently shorter, as well as capable of being overlapped, that substantial gain in overall production can be realized by reducing the time cycle of the transfer operation.

This is achieved in the present invention by providing a double arm transfer carriage which requires an indexing or overturning movement of the transfer arms only on the forward stroke of the machine which in turn, by eliminating the wasteful return or resetting movement, shortens the overall time cycle, and increases the overall production rate of the integrated assembly system.

The features of the invention believed new and patentable are set forth in the following claims.

What is claimed is:

1. A mechanism for transferring upholstery spring coils a row at a time from a feeding station to a delivery station, wherein the improvement comprises
   a carriage mounted for reciprocation between the two stations,
   said carriage having thereon a rotatable shaft positioned transversely of the direction of reciprocation and an indexing drive for turning the shaft through onehalf revolution in the same direction on each succeeding traverse of the carriage from the feeding station to the delivery station,
   a plurality of transfer arms on said shaft arrayed in a common plane which includes the shaft, and disposed in said common plane as aligned pairs extending perpendicularly from the shaft in opposite directions,
   each arm having at its free end a gripper adapted to enter said feeding station and to grasp and hold a helical wire upholstery spring coil firmly between the ends of such coil so as to withdraw the coil forcibly therefrom transversely of the coil axis at the beginning of the delivery traverse of the carriage with said coils in trailing relation to said shaft, to reposition the overturned coil in advancing relation to the shaft by said half-revolution, and to insert the overturned coil forcibly into the delivery station by a thrusting movement transverse to the coil axis as the conclusion of said delivery traverse,
   powered drive means for reciprocating the carriage between the stations,
   powered means for closing and opening the grippers, and
   control means for coordinating the application of power to cause said grippers to grasp and hold a row of coils at the feeding station, to propel the carriage toward the delivery station while rotating said shaft through said one-half revolution, to cause said grippers to release the coils at the delivery station, and to return the carriage to the feeding station.

2. The mechanism of claim 1 wherein the indexing drive, the powered drive means for reciprocating the carriage, and the forward means for opening and closing the grippers, are powered by air, and the control means comprises solenoid-operated valves in the air supply lines to said indexing drive and powered means energized through switches actuated by the reciprocation of the carriage.

* * * * *